No. 801,023. PATENTED OCT. 3, 1905.
A. H. LAROCHELLE.
ROSSING MACHINE.
APPLICATION FILED APR. 12, 1905.

5 SHEETS—SHEET 2.

Witnesses

Inventor
A. H. Larochelle
by
Fred B. Fetherstonhaugh
atty

No. 801,023. PATENTED OCT. 3, 1905.
A. H. LAROCHELLE.
ROSSING MACHINE.
APPLICATION FILED APR. 12, 1905.

5 SHEETS—SHEET 3.

Witnesses
Inventor

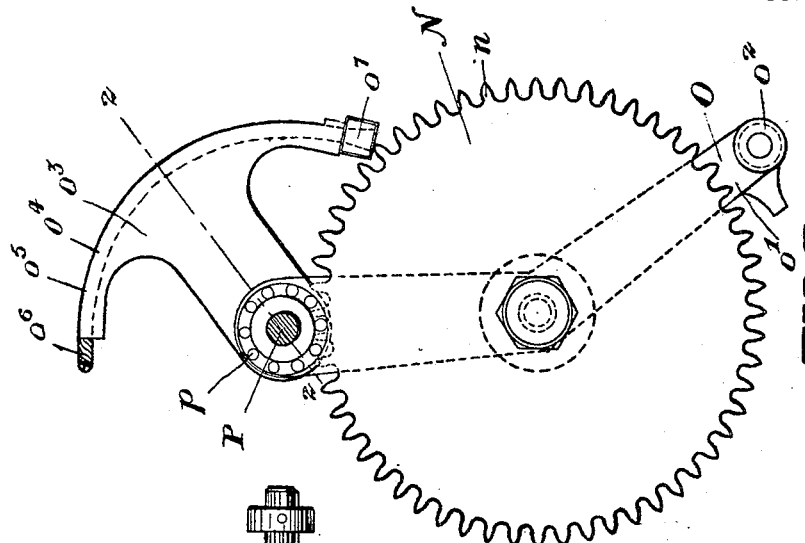
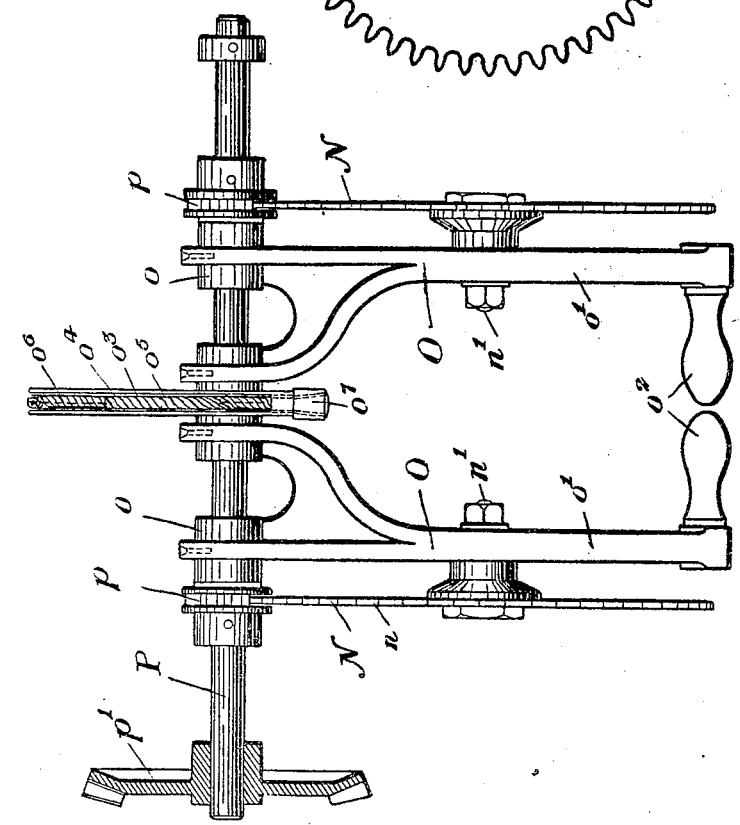

No. 801,023. PATENTED OCT. 3, 1905.
A. H. LAROCHELLE.
ROSSING MACHINE.
APPLICATION FILED APR. 12, 1905.

5 SHEETS—SHEET 5.

Witnesses

Inventor
A. H. Larochelle
by
Fred. B. Fetterstonhaugh
atty.

UNITED STATES PATENT OFFICE.

ANSELME HIPPOLYTE LAROCHELLE, OF LEVIS, CANADA.

ROSSING-MACHINE.

No. 801,023.　　　　　Specification of Letters Patent.　　　　　Patented Oct. 3, 1905.

Application filed April 12, 1905. Serial No. 255,157.

*To all whom it may concern:*

Be it known that I, ANSELME HIPPOLYTE LAROCHELLE, mechanical engineer, of the town of Levis, in the county of Levis, Province of Quebec, Dominion of Canada, have invented certain new and useful Improvements in Rossing-Machines, of which the following is a specification.

My invention relates to improvements in rossing-machines; and the objects of my invention are to provide a machine of this class which shall be cheap, simple in operation, rapid in action, and which will carry the billets of wood into the required operating position and will thoroughly ross the bark therefrom without any handling of the billet after it has once been placed on the machine and to provide means for removing the bark after it has been rossed from the billets; and it consists, essentially, of a rotatably-mounted disk provided with a plurality of knives on the surface thereof, a plurality of fans secured to the rear side of the said disk, a case inclosing said disk, an aperture in said case, means for conveying the billets into position in front of said aperture, and means for holding and rotating the billets on the surface of the said disk, the various parts of the device being constructed and arranged in detail, as hereinafter more particularly described.

Figure 1:
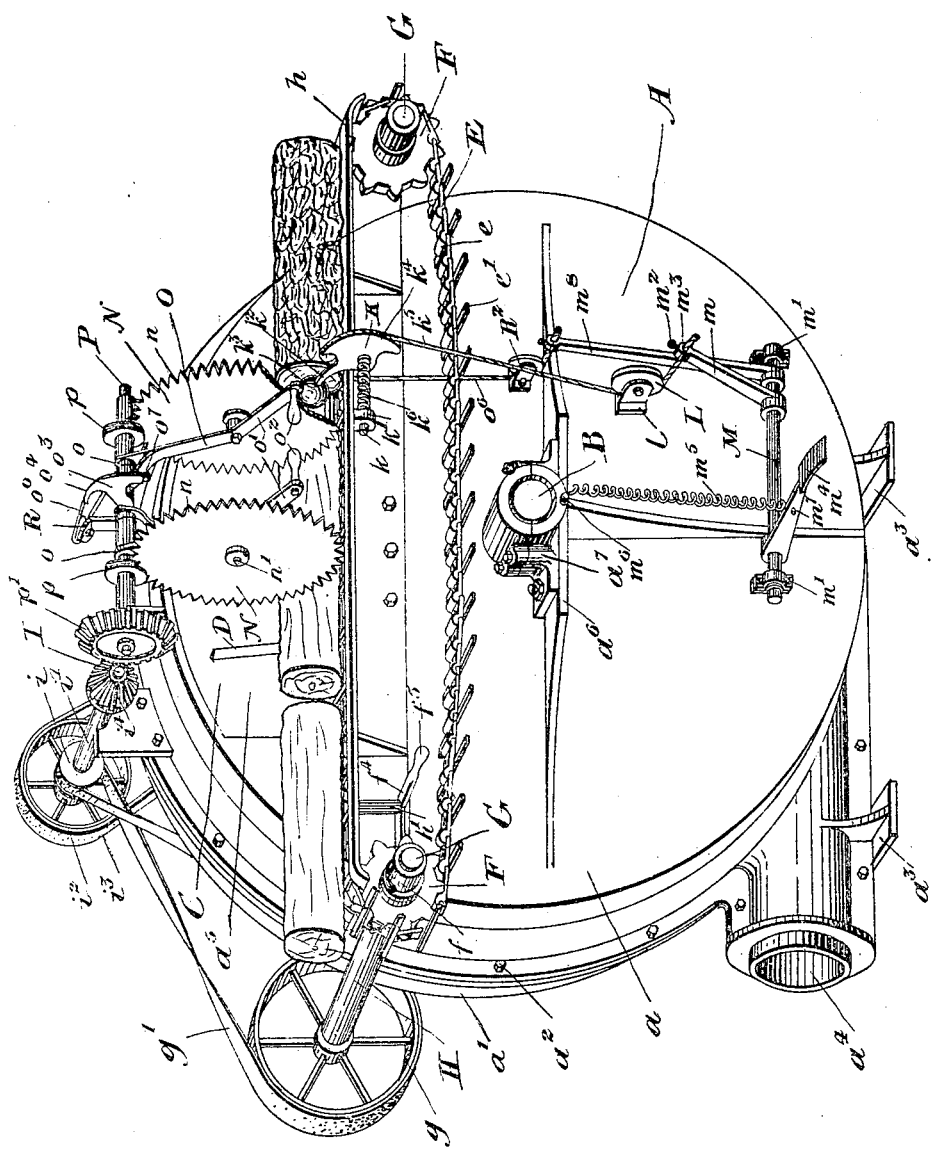
Figures 2, 3, 4:
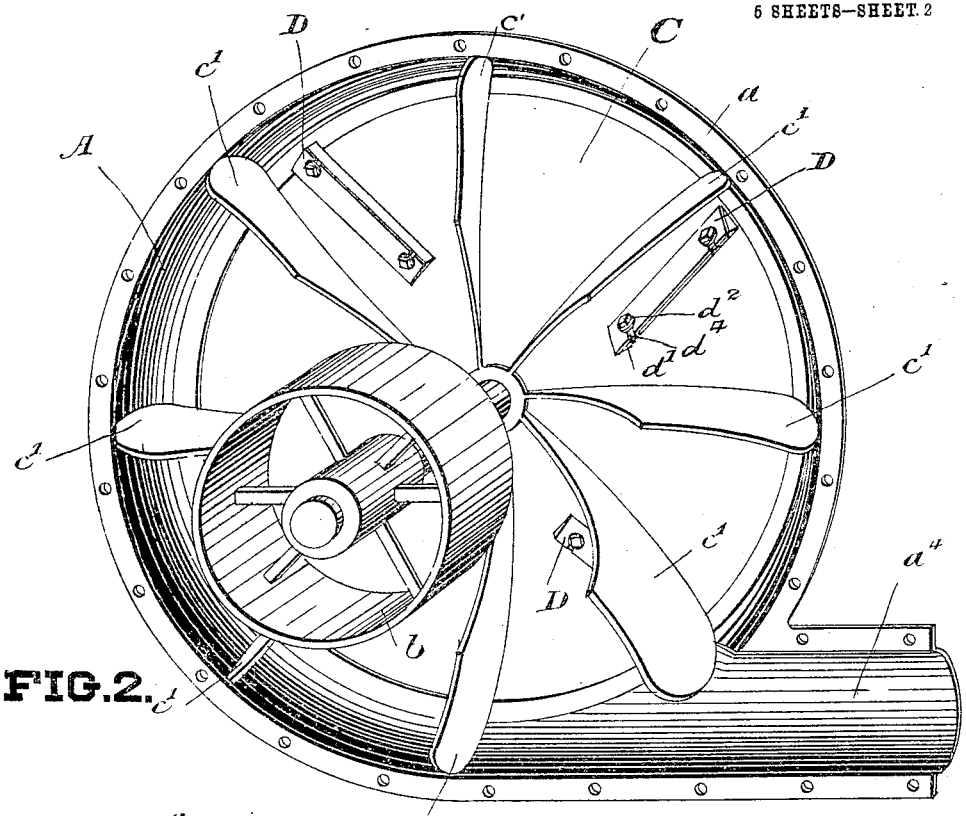
Figure 5:
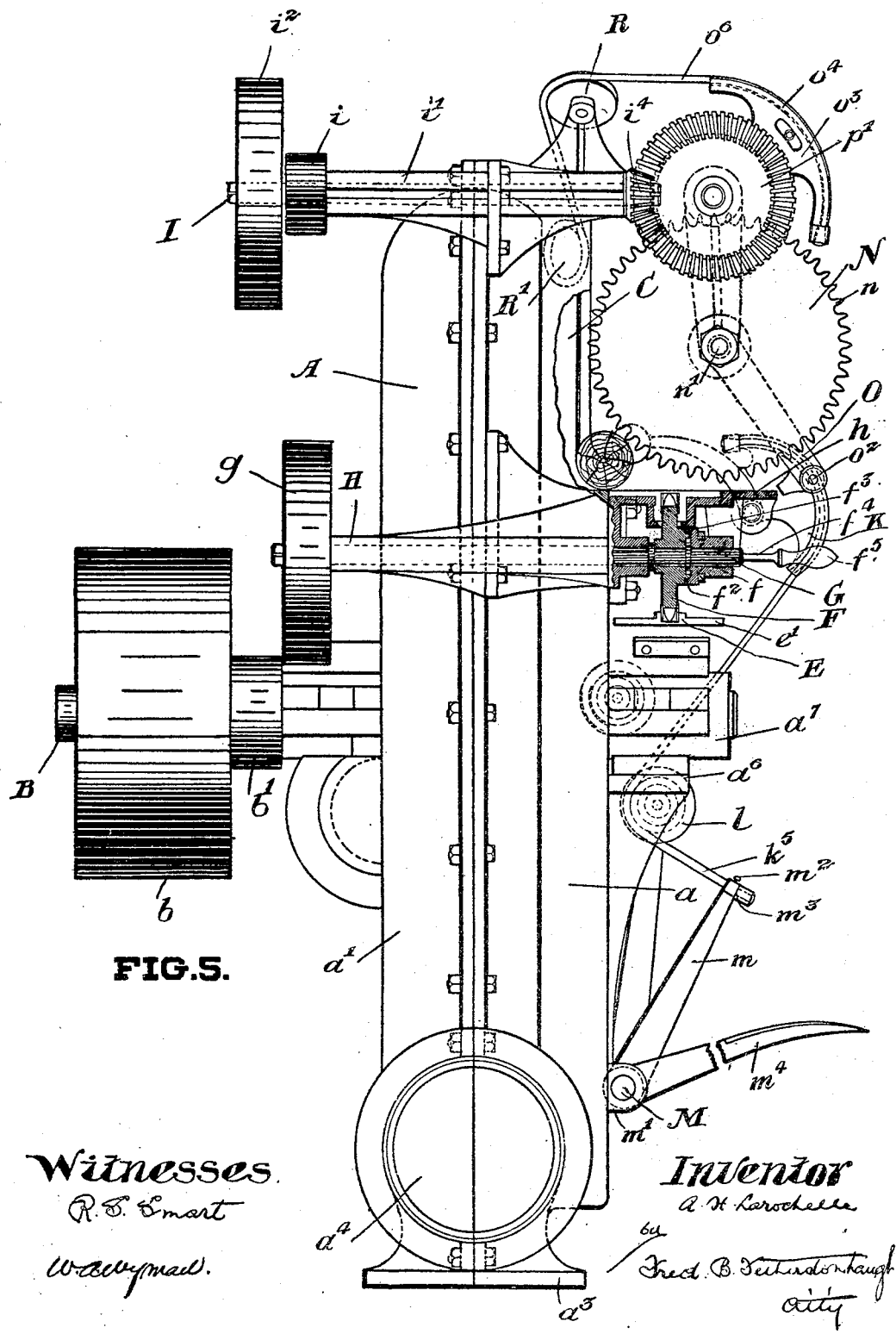
Figure 8:
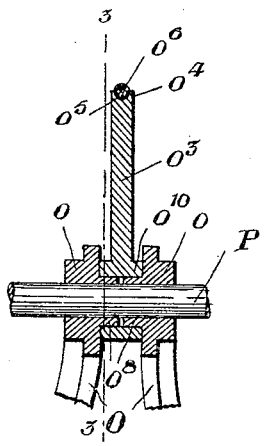
Figure 9:
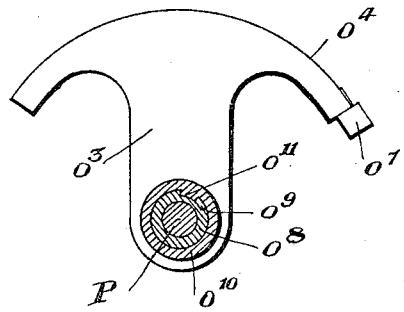
Figure 10:
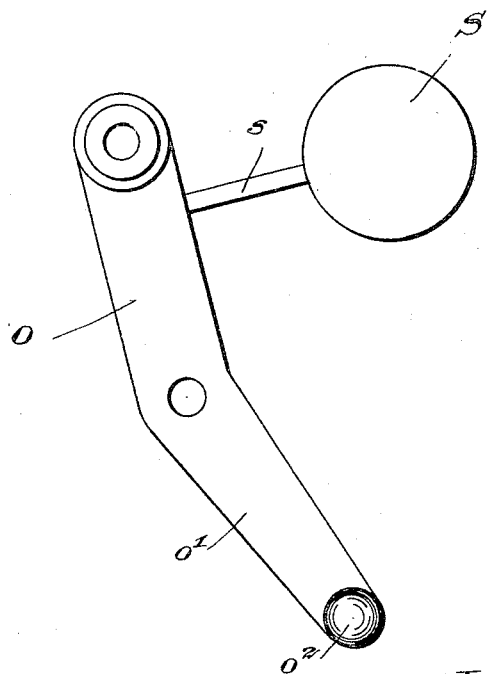

Figure 1 is a perspective view of my improved rossing-machine with the billets in position thereon. Fig. 2 is a perspective view of the interior of my machine, showing the construction of the rotating disk, half of the casing having been removed. Fig. 3 is an enlarged detail showing a sectional view of the knives attached to the rotating disk. Fig. 4 is a diminutive front elevation of the casing of my machine, showing the form of aperture provided therein. Fig. 5 shows a side elevation of my machine, parts thereof being in section to more clearly show the construction. Fig. 6 is an enlarged detail giving a top view of the mechanism used to hold and rotate the billets on the surface of the rotating disk. Fig. 7 is an end view of the device shown in Fig. 6. Fig. 8 is a sectional view on the line 2 2, Fig. 7. Fig. 9 is a sectional view on the line 3 3, Fig. 8. Fig. 10 is an elevation showing an alternative form of a portion of my device.

In the drawings like letters of reference indicate corresponding parts in each figure.

Referring to the drawings, A represents the casing of my machine, which may be of any suitable form, but preferably consisting of two parts $a$ and $a'$, as shown, held together by means of bolts $a^2$ and having suitable stands $a^3$ at the bottom thereof to enable them to remain in an upright position. In the lower portion of the case an opening $a^4$ is provided, and an opening $a^5$ is also provided at the front of the said casing for purposes to be hereinafter described. A flange $a^6$ outwardly extends from the front of the case, supporting a bearing-box $a^7$, in which is journaled the central shaft B. At one end of this shaft a pulley $b$ is secured, adapted to be connected to a suitable source of power. To the center of the said shaft B a circular disk or plate C is secured, so that it will be caused to rotate with the shaft. A plurality of cutting-knives D are secured to the said disk, so as to expose their cutting edges on the front surface thereof. This may be accomplished in any desired manner; but that I prefer is to provide slots $d$ in the disk and adjustably secure the knives D to suitable seats $d'$ by means of screws $d^2$, which extend through slots $d^4$ in the knives and are tapped into recesses $d^3$, provided in the seat $d'$. The direction of the knives is preferably at a slight angle to the radii of the disk, whereby when they engage the billet the tendency will be to aid the billet to turn while being raised. A plurality of fan-blades $c'$ of a suitable shape are made integral with or secured to the back of the disk C, and by this means the bark rossed from the billets by the knives D is blown out of the casing through the opening $a^4$.

E is a conveying-belt comprising a plurality of chain-links $e$ and having secured at even intervals along the top surface thereof a plurality of carrying-bars $e'$. Sprocket-wheels F, secured to shafts G, journaled in a frame H, engage the said chain at each side of the case supporting it, with the top surface thereof directly below the opening $a^5$ in the case A. The frame H, as well as providing journals for the shafts G, also extends along the front of the case and provides a steadying-platform $h$ for the top surface of the chain, whereby the top thereof may always lie horizontal. To the end of one of the shafts G a pulley $g$ is secured, connected by a belt $g'$ or other suitable means to a similar pulley $i$, which is secured to a shaft I, journaled in a frame $i'$, which is secured to the case A. A second pulley $i^2$ is secured to the shaft I and connected by a belt or other means $i^3$ to the pulley $b'$ on the central shaft B. The shaft G is not directly connected to the sprocket-wheel F, but has a clutch $f$ interposed between them. This clutch may be made in any desirable manner, that I have shown consisting of a sleeve $f'$, provided with teeth $f^2$, which engage with like teeth $f^3$, provided in the sprocket-wheel F. A bell-crank lever $f^4$, pivoted on a projection $h'$, secured to the frame H and provided with a handle $f^5$, is attached in a suitable manner to the said sleeve $l'$, whereby the clutch may be conveniently thrown in and out of engagement. The motion of the belt is thus controlled by the movement of the handle $f^5$.

K is a disk pivoted on a shaft $k$, journaled in bearings $k'$, secured to the frame H. An arm $k^2$ extends outwardly from one side thereof and has a sphere $k^3$ integral with or secured to the end thereof, the said sphere $k^3$ being designed to normally lie slightly above the center of the top of the conveying-belt E, as indicated in Fig. 1, the said disk K being placed about the beginning of the aperture $a^5$ in the case. The said disk K has a grooved periphery $k^4$ provided, and a rope or chain $k^5$ is secured thereto, the said rope being led downwardly through a pulley L, journaled in a bearing $l$, secured to the case A, to a lever $m$, which is rigidly secured to a shaft M, journaled in bearings $m'$, secured to the frame. The end of the rope may be secured to the lever $m$ in any desired manner, that I have shown consisting of a thumb-screw $m^2$, which clamps the rope which is led through the slot $m^3$. A spring $k^6$ normally holds the disk K, with the sphere $k^3$ in position over the top of the conveying-belt. A foot-lever $m^4$ is secured to the shaft M, and a spring $m^5$ joins a point $m^6$ on the flange $a^6$ to a point $m^7$, intermediate of the length of the foot-lever $m^4$, thus normally holding it in a horizontal position. It will thus be seen that when the foot-lever $m^4$ is depressed the lever $m$ will be rotated, which will exert a pull on the rope $k^5$, which will rotate the disk K, swinging the sphere $k^3$ out of its position on the top of the belt. The purpose of the disk K and sphere $k^3$ is as follows: After the conveying-belt has carried the billet to its position in front of the rotating knives the pressure on the lever $m$ is released, allowing the sphere $k^3$ to fall back into its normal position in the center of the conveying-belt abutting the end of the log which has just been carried into position. This presses against the log and counteracts the tendency of the knives to thrust it endwise.

N represents two circular disks provided at their periphery with a plurality of sharp teeth $n$. The said disks are rotatably mounted on shafts $n'$, which are held in frames O, the said frames O being rotatably supported from a shaft P, journaled in the frame $i'$, by means of the sleeves $o$, made integral therewith. Handles $o^2$ are provided on arms $o'$, which extend from the frames O, whereby the frames O, and hence the disks N, may be conveniently raised or lowered. Pinions $p$ are secured to the shaft P, adapted to engage the teeth on the disks N, whereby they may be rotated.

It may here be well to mention an alternative form of the frame O, which I have shown in Fig. 10. In this form I secure a heavy weight S on a lever $s$, secured to the frame O and outwardly extending therefrom. By this means the weight bearing on the billets to press them in contacting with the rotating knives is increased, and, furthermore, when the frames are raised up until the weight S is moved past the center line of the shaft P the frames and disks will remain in that position. This may be desirable in certain cases where the billets are so rough that they will require to be pressed against the rotating knives by hand.

It is to be noted that each of the disks N is independently supported from the shaft P, and so may adjust itself to the variations in thickness of the billet on which it rests. A beveled gear-wheel $p'$ is secured to the end of the shaft P and adapted to engage with its pinion $i^4$, provided on the shaft I, whereby when the shaft I is rotated its motion may be transmitted to the shaft P, and hence to the disks N.

A disk $o^3$, provided with a curved periphery $o^4$, is secured to the frames O as follows: Outwardly-extending annular flanges $o^8$ are provided on the top $o$ of the frames O. A sleeve $o^{10}$, provided on the disk $o^3$, fits snugly around both of these flanges, having a limited rotary movement with regard to the same. I provide for this limited rotary movement by means of the lug $o^{11}$, which is made integral with the sleeve $o^{10}$ and which works in slots $o^9$, provided on the flanges $o^8$. By this means each of the frames O has a certain limited motion with regard to this disk $o^3$, and each frame O can be raised or lowered independently of the other frame. A groove $o^5$ is provided in the curved periphery $o^4$ of the said disk $o^3$, and a rope $o^6$ is secured therein by suitable means, such as the block $o^7$, secured to the end thereof. This rope or chain is led over suitably-journaled pulleys R, R', and R$^2$ to a lever $m^8$, which is secured to the shaft M. It will thus be seen that when the foot-lever $m^4$ is depressed the lever $m^8$ will be rotated, which will exert a pull on the rope $o^6$, rotating the disk $o^3$, which rotates the frames O, and hence the disks N, raising them out of contact with the billet on the conveying-belt. It is to be noted that by means of the lug $o^{11}$ working in the slot $o^9$ I am enabled to raise both the frames together; but freedom of motion is permitted to each when resting on the billet, whereby it can adjust itself to suit the varying cross-section of the billet.

Having described the various elements in my mechanism, I will now briefly point out the method of operation of the same.

The machine is suitably connected to a source of power which continually rotates the main shaft B, together with the disk C and blades D, and being connected to the pulley $i$ rotates it also, and hence the shafts I, P, and G all have a continuous rotary motion. The billet of wood from which the bark is desired to be rossed is placed on the right-hand end of the top of the conveying-belt, as shown in Fig. 1. The lever $m^4$ is then depressed, which simultaneously raises the disks N and withdraws the lever K from across the top of the belt. The handle $f^5$ is then operated, which throws the sprocket-wheel F into engagement with the rotating shaft G, which causes the belt E to move, conveying the billet, which has been placed on the right-hand end, along the front of the case. When it has reached the position in the center of the opening $a^5$, the clutch $f$ is thrown out of engagement, thus causing the operation of the belt to cease and leaving the billet in position in front of the opening $a^5$. The lever $m^4$ is released, which permits the circular disks N to drop into position, with their toothed peripheries bearing on the billet. At the same time the disk K and sphere $k^3$ drop into position in the rear of the billet. It is to be noted that the frames O pivotally supporting the circular disks N, being themselves pivoted to the shaft P, cause the weight of the frames and the disks to rest largely on the billet, thus forcing it into contact with the front surface of the disk C, having the knives D secured thereon. The disks N being continuously rotated by the pinions $p$ on the shaft P will rotate the billet as soon as they come in contact therewith, and the bark of the billet will be rossed therefrom by means of the knives D on the disk C, which is continuously rotating. The rossing is accomplished by the successive passing of the knives over the entire length of the billet, which is meanwhile rotated by means of the toothed circular disks N. One or two turns of the billet I usually find is quite sufficient to remove all the bark therefrom. The tendency of the knives to move the billet back on the conveying-belt is overcome by the pressure of the lever $k^2$, which, together with the pressure exerted by the weight of the disks N, firmly holds the billet in the required position during rossing. While one billet is being rossed another may be placed in position on the right of the conveying-belt, and as soon as one is thoroughly rossed the operation hereinbefore described is repeated, which places a new billet in position before the rotating knives and carries the old one to the left end of the belt, as shown. The next operation of the belt will cause this billet at the left to drop off the machine. The bark having been rossed is cleaned out of the inside casing by means of the rotating fan-blades $c'$, secured to the rear of the disk, which blow the bark out through the opening $a^4$. It will thus be seen that I have devised a machine in which the only manual labor necessary is that required to place the billet on the conveying-belt, the operation on the billet after it has been placed on the conveying-belt being controlled by means of the foot and hand lever, as hereinbefore described.

It is to be understood that in carrying out the construction of my invention considerable variations may be made in the form of machine without materially departing from the spirit of my invention. For example, it might be found desirable to vary considerably the shape of the inclosing case, the form of belt used, the method of securing the fan-blades to the disk, and other details; but all such changes would come within the scope of mechanical skill and might therefore be made without departing from the spirit of my invention.

What I claim as my invention is—

1. In a rossing-machine the combination with means for rossing the bark from the billets of a conveying-belt to convey the billets into operating position to said means, a pivotally-supported disk provided with a curved periphery, an arm on said disk extending across the top of said conveying-belt, a ball secured to the end of said arm and adapted to normally engage the rear of the billet being rossed, a spring normally holding said arm and billet in position, a foot-lever, a rope or chain connected to the curved periphery, of said disk and means for imparting the motion of said foot-lever to said rope or chain as and for the purpose specified.

2. In a rossing-machine in combination a plurality of rotatably-mounted knives and means for rotating the same, of means for rotating the billets, means for producing a pressure on the sides of the billet to hold it in contact with the rossing-knives an arm extending across the end of the billet and preventing longitudinal movement thereof and means for simultaneously withdrawing said arm and releasing the pressure on the sides as and for the purpose specified.

3. In a rossing-machine in combination a plurality of rotatably-mounted knives, means for rotating the same, a plurality of circular disks provided with toothed peripheries adapted to contact with the billets to be rossed, a shaft located above the disks, means for operating the same, frames loosely supported thereon, and depending therefrom, means for rotatably supporting said disks on said frames, so that said disks will bear by their weight and the weight of the frames against the billets and means for rotating said disks as and for the purpose specified.

4. In a rossing-machine in combination a plurality of rotatably-mounted knives, means for rotating the same, a plurality of circular disks provided with toothed peripheries adapted to contact with the billets to be rossed, means for rotating said disks, frames rotatably supporting said disks, means for pivotally supporting said frames a central disk secured to said frames and having a limited rotary motion with regard to the same and provided with a grooved periphery, a rope or chain lying in said groove, and suitably secured thereto, a foot-lever and means for communicating the motion of said foot-lever to said rope or chain as and for the purpose specified.

5. In a rossing-machine in combination a plurality of rotatably-mounted knives, means for rotating the same, a plurality of circular disks provided with toothed peripheries adapted to contact with the billets to be rossed, means for rotating said disks, frames rotatably supporting said disks, and means for pivotally supporting said frames, annular flanges secured to the top of said frames, a central disk provided with a grooved periphery, a sleeve thereon adapted to fit loosely on the aforesaid annular flanges, a slot provided on said annular flanges and a lug on said sleeve adapted to work in said slot permitting a limited rotary motion of the said disk with regard to said frames, a rope or chain secured to said grooved periphery of said disk, means for communicating motion thereto as and for the purpose specified.

6. In a rossing-machine in combination a plurality of rotatably-mounted knives, means for rotating the same, a plurality of circular disks provided with toothed peripheries, means for independently supporting said disks in contact with the billets, means for rotating said disks and means for simultaneously raising said disks out of contact with said billets as and for the purpose specified.

7. In a rossing-machine in combination a plurality of rotatably-mounted knives, means for rotating the same, a plurality of circular disks provided with toothed peripheries, frames rotatably supporting said disks with their peripheries in contact with the billets, a shaft pivotally supporting said frame, means for mounting and rotating said shaft, pinions secured to said shaft and geared with the teeth of said disks as and for the purpose specified.

8. In a rossing-machine in combination a plurality of rotatably-mounted knives, means for rotating the same, a plurality of circular disks provided with toothed peripheries, means for rotating said disks, means for supporting said disks with their weights bearing on the billets to force them in contact with said knives, a belt adapted to convey the billets into position before said disks, a pivotally-supported lever adapted to normally extend across the rear of the billet when in position and prevent longitudinal movement of the same, and means for simultaneously raising the toothed disks and the said lever as and for the purpose specified.

9. A rossing-machine comprising a central shaft, a disk mounted thereon, a plurality of blades secured to the rear of said disk and extending through slots provided in the face thereof, a plurality of fan-blades secured to the rear of said disk, a case inclosing said disk and fan-blades and providing a bearing for said shaft and having a conveying-belt, comprising a plurality of chain-links, a plurality of sprocket-wheels engaging the ends of said belt, shafts supporting the same, means for rotating one of the shafts, means for communicating the motion of said shaft to said sprocket-wheel, a frame extending under the top surface of said belt holding it in a horizontal position, a plurality of disks provided with toothed peripheries adapted to contact with the billets, a plurality of frames rotatably supporting said disks, a shaft pivotally supporting said frames, means for rotating said shaft means for communicating the motion of said shaft to said toothed disks, means operable from the foot of the machine for raising said disks out of contact with the billets a pivotally-supported lever extending across the rear of the billet to prevent longitudinal movement of the same and means for rotating said lever out of engagement with said billet simultaneously with the raising of the toothed disks substantially as described.

10. In a rossing-machine, the combination with a suitable frame and cutting-disk mounted therein, of a billet-supporting platform, a plurality of turning disks transversely disposed to said cutting-disk, independently-supported tiltable frames adapted to rotatably support each disk and means for rotating said disks as and for the purpose specified.

11. In a rossing-machine, the combination with a suitable frame and cutting-disk mounted therein, of a billet-supporting platform, a plurality of turning disks provided with toothed peripheries transversely disposed to said cutting-disks, frames rotatably supporting said disks, a shaft tiltably supporting said frames, a pinion on said shaft adapted to engage the teeth on said disks as and for the purpose specified.

12. In a rossing-machine, the combination with a suitable frame and cutting-disk mounted therein, of a billet-supporting platform, a plurality of turning disks transversely disposed to said cutting-disk, independently-supported tiltable frames adapted to rotatably support each disk, means for simultaneously raising both frames and means for rotating the said disks as and for the purpose specified.

13. In a rossing-machine, the combination with a suitable frame and cutting-disk mounted therein, of a feeding-belt extending transversely across said frame, a pivotally-supported lever extending normally across said belt, a plurality of turning disks transversely disposed to said cutting-disk, means for rotating the same, and means for simultaneously raising the said turning disks and removing said lever from across the feeding-belt as and for the purpose specified.

Signed at the office of United States consul, in the Province of Quebec, this 8th day of April, 1905, city of Quebec, Canada.

ANSELME HIPPOLYTE LAROCHELLE.

Witnesses:
CHARLES FREDERICK MACGILL,
SADIE ELIZABETH GREEN.